US 8,576,830 B2

(12) United States Patent
Swarts et al.

(10) Patent No.: US 8,576,830 B2
(45) Date of Patent: Nov. 5, 2013

(54) METHOD AND SYSTEM FOR TRACKING TIMING DRIFT IN MULTIPLE FREQUENCY HYPOTHESIS TESTING

(75) Inventors: Francis Swarts, San Diego, CA (US); Mark Kent, Vista, CA (US)

(73) Assignee: Broadcom Corporation, Irvine, CA (US)

(*) Notice: Subject to any disclaimer, the term of this patent is extended or adjusted under 35 U.S.C. 154(b) by 511 days.

(21) Appl. No.: 12/768,379

(22) Filed: Apr. 27, 2010

(65) Prior Publication Data

US 2011/0243104 A1 Oct. 6, 2011

Related U.S. Application Data

(60) Provisional application No. 61/320,371, filed on Apr. 2, 2010.

(51) Int. Cl.
*H04J 3/06* (2006.01)
(52) U.S. Cl.
USPC .......................................................... 370/350
(58) Field of Classification Search
USPC .......................................................... 370/350
See application file for complete search history.

(56) References Cited

U.S. PATENT DOCUMENTS

| 2001/0043641 A1* | 11/2001 | Harms et al. ............... 375/130 |
| 2002/0054624 A1* | 5/2002 | Boloorian .................. 375/150 |
| 2010/0041338 A1* | 2/2010 | Hannagan .................. 455/62 |

* cited by examiner

*Primary Examiner* — Mark Rinehart
*Assistant Examiner* — Maharishi Khirodhar
(74) *Attorney, Agent, or Firm* — Sterne, Kessler, Goldstein & Fox P.L.L.C.

(57) ABSTRACT

A mobile device receives a signal comprising a PSS and performs multiple frequency hypothesis testing (MFHT) on the received signal. The mobile device starts MFHT by applying different initial frequency offsets in corresponding MFH branches. Timing drift in MFHT is compensated based on corresponding initial frequency offsets. In this regard, a PSS correlation process is performed on the received signal in each MFH branch. Resulting PSS correlation data is buffered and processed in corresponding PSS timing hypothesis buffers. The timing position of samples is updated in the PSS timing hypothesis buffers based on corresponding initial frequency offsets. Energy associated with the PSS transmissions may be accumulated utilizing corresponding PSS correlation data at updated sampling positions. The received PSS is detected based on a maximum accumulated energy associated with the PSS transmissions. Information that comes from the detected PSS is utilized by the mobile device to camp on a corresponding cell.

20 Claims, 8 Drawing Sheets

METHOD AND SYSTEM FOR TRACKING TIMING DRIFT IN MULTIPLE FREQUENCY HYPOTHESIS TESTING

CROSS-REFERENCE TO RELATED APPLICATIONS/INCORPORATION BY REFERENCE

This patent application makes reference to, claims priority to and claims the benefit from U.S. Provisional Patent Application Ser. No. 61/320,371 filed on Apr. 2, 2010.

This application makes reference to:
U.S. Application Ser. No. 61/288,053 filed on Dec. 18, 2009,
U.S. application Ser. No. 12/721,979 filed on Mar. 11, 2010,
U.S. Application Ser. No. 61/312,555 filed on Mar. 10, 2010,
U.S. application Ser. No. 12/732,052 filed on Mar. 25, 2010,
U.S. Application Ser. No. 61/318,660 filed on Mar. 29, 2010,
U.S. application Ser. No. 12/766,752 filed on Apr. 23, 2010,
U.S. application Ser. No. 61/321,402 filed on even date herewith,
U.S. application Ser. No. 12/768,415 filed on even date herewith, and
U.S. application Ser. No. 12/721,979 filed on Mar. 11, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for tracking timing drift in multiple frequency hypothesis testing.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference, broadcast, and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for tracking timing drift in multiple frequency hypothesis testing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for tracking timing drift in multiple frequency hypothesis testing. A mobile device is operable to receive a radio frequency (RF) signal from an associated base station. The received signal may comprise a PSS and a SSS, which may be used by the mobile device to acquire cell-specific parameters. In this regard, the mobile device may perform multiple frequency hypothesis testing (MFHT) on a corresponding baseband signal for the received RF signal. The mobile device may start MFHT by applying different initial frequency offsets to corresponding MFH branches. Compensation may be provided for timing drift in MFHT based on the initial frequency offsets that are applied to the corresponding MFH branches. A PSS correlation process on the baseband signal is performed in each MFH branch. Resulting PSS correlation data may be buffered and processed in corresponding PSS timing hypothesis buffers. The timing position of samples in the PSS timing hypothesis buffers may be updated based on initial frequency offsets applied to corresponding MFH branches. The timing positions or sampling positions for samples in the PSS timing hypothesis buffers refer to positions at which magnitudes of the buffered PSS correlation data are accumulated in the corresponding PSS timing hypothesis buffers. A rate at which the timing positions of samples in the PSS timing hypothesis buffers are updated may be determined by the initial frequency offsets that are applied to the corresponding MFH branches. For example, for a MFH branch with an initial frequency offset of 2 ppm, the timing position of samples in corresponding PSS timing hypothesis buffers is updated once every five hundred thousand samples. The timing position of samples in the PSS timing hypothesis buffers may be shifted or updated to advance or retard timing depending on the sign of the initial applied frequency offsets. For example, for positive initial frequency offsets, the timing position of samples in the PSS timing hypothesis buffers may be shifted or updated to retard or delay timing. For negative initial frequency offsets, the timing position of samples in the PSS timing hypothesis buffers may be shifted or updated to advance timing. Energy associated with the PSS transmissions may be accumulated in each MFH branch utilizing corresponding PSS correlation data at updated sampling positions. The received PSS may be detected based on a maximum accumulated energy associated with the PSS transmissions. The mobile device may utilize information that comes from the detected PSS to start camping on a corresponding cell.

Figure 1:
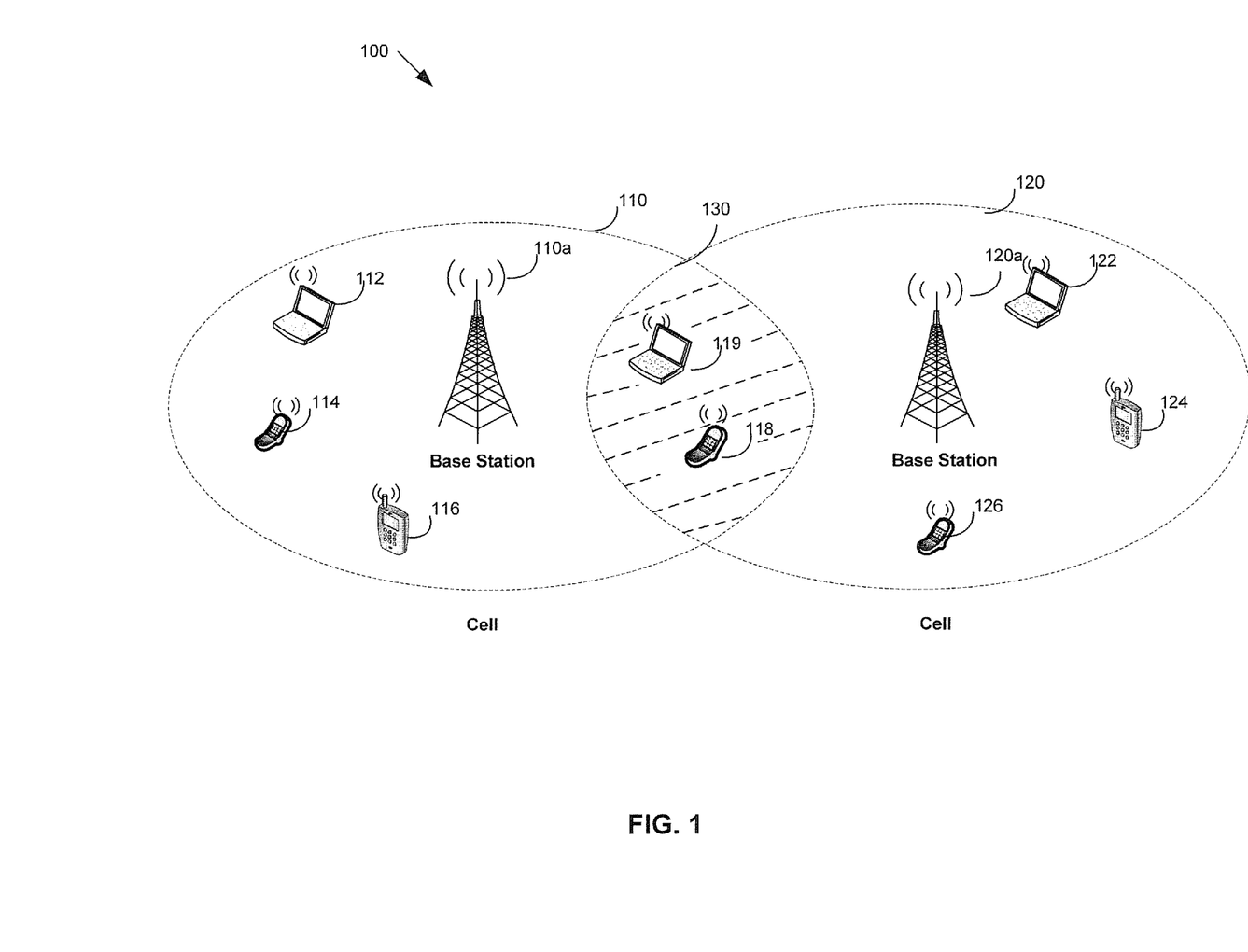
FIG. 1 is a diagram illustrating an exemplary wireless communication system that is operable to track and compensate timing drift in multiple frequency hypothesis testing (MFHT), in accordance with an embodiment of the invention.

FIG. 1 is a diagram illustrating an exemplary wireless communication system that is operable to track and compensate timing drift in multiple frequency hypothesis testing (MFHT), in accordance with an embodiment of the invention. Referring to FIG. 1, there is shown a wireless communication system 100. The wireless communication system 100 comprises a plurality of cells, of which cells 110-120 are displayed. A coverage area 130 is the overlapped coverage area of the cell 110 and the cell 120. The cell 110 and the cell 120 are geographic areas served by a base station 110a and a base station 120a, respectively. The wireless communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as reference signals and synchronization signals may not carry information from higher layers. Reference signals from the base station 110a may be utilized by mobile devices in the cell 110 to determine channel impulse responses (CIRs). A specified reference signal is assigned to each cell within a network and acts as a cell-specific identifier. Synchronization signals may comprise primary secondary synchronization sequences (PSS) and secondary synchronization sequences (SSS). For example, in E-UTRA/LTE, the base station 110a may be operable to repeatedly transmit the PSS and the SSS in every repetition interval, for example, 5 ms, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence, which is unique to an associated mobile device. The scrambling code may be linked or mapped to, for example, the index of the PSS. After successful time and frequency synchronization via the PSS, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs is base station or cell specific.

The mobile device 118 may be operable to detect or select a particular PSS from the received plurality of PSSs to acquire PSS synchronization. The detected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively. PSS correlation data may be accumulated in one or several time slot durations, for example. Resulting correlation peaks may indicate possible PSS symbol timing hypotheses under consideration. The mobile device 118 may be operable to detect the particular PSS according to the resulting correlation peaks. Furthermore, the mobile device 118 may be operable to utilize the PSS correlation data to estimate frequency offset associated with the particular PSS. Due to, for example, propagation delay, Doppler shift, and/or oscillator drift, there may be a wide range of uncertainty regarding the correct PSS symbol timing and/or correct local oscillator frequency for the receiver.

The uncertainties in the correct PSS symbol timing and frequency offset for the local oscillator may cause the mobile device 118 to fail to detect the particular PSS when present, erroneously detect the particular PSS when none may be present, or detect the particular PSS but fail to estimate the correct PSS symbol timing and/or local oscillator frequency offset, thereby losing data. In this regard, the mobile device 118 may be operable to perform multiple frequency hypotheses testing (MFHT) for a correct PSS timing hypothesis and frequency offset estimation. A set of different initial frequency offsets may be selected within a frequency offset estimation range, namely, a local oscillator frequency uncertainty range, for example, +/−15 ppm. One initial frequency offset may be applied to or placed in each multiple frequency hypothesis (MFH) branch in the multiple frequency hypothesis testing. A MFH branch may be associated with a specific PSS timing hypothesis buffer. PSS correlation data in each MFH branch may be buffered and processed within a corresponding PSS timing hypothesis buffer. A PSS timing hypothesis buffer may comprise possible PSS timing hypotheses over one or more repetition intervals of the PSS transmission. The PSS timing hypotheses in the PSS timing hypothesis buffer may correspond to successive PSS retransmissions from, for example, the base station 110*a*. Depending on a sampling frequency utilized in a specific MFH branch and repetition intervals of the PSS transmission, the number of PSS timing hypotheses may vary within a PSS timing hypothesis buffer associated with the specific MFH branch. For example, for E-UTRA/LTE, a PSS timing hypothesis buffer may comprise 4,800 or 9,600 PSS timing hypotheses per half frame. Each of the PSS timing hypotheses may have an equal likelihood of being selected as a correct PSS timing hypothesis at which the particular PSS is signaled, that is, the slot boundary occurs. The correct PSS timing hypothesis and associated slot boundary may be determined on the basis of maximum accumulated energy associated with the PSS transmission, for example.

In various embodiments of the invention, the mobile device 118 may be configured to track and provide compensation for timing drift in MFHT so as to provide optimal estimation of frequency offset. Depending on an initial frequency offset imported to or placed in a MFH branch, timing drift may, for example, cause PSS correlation samples to appear in several buffer positions and/or timing hypotheses over the duration of the MFHT, which in turn may cause PSS correlation energy not to be optimally combined into a single timing hypothesis position within the PSS buffer. In this regard, the mobile device 118 may be operable to update the timing position of samples in PSS timing hypothesis buffers in order to compensate timing drift in MFHT. A rate for updating the timing position of samples in a PSS timing hypothesis buffer may be determined by an initial frequency offset placed in an associated MFH branch. For example, for a MFH branch with an initial frequency offset of 2 ppm, timing drift may be off by one sample every five hundred thousand samples. In this regard, the timing position of samples in an associated PSS timing hypothesis buffer may be updated once every five hundred thousand samples.

In addition, depending on the sign of the initial frequency offset placed in the MFH branch, the timing position of samples in the associated PSS timing hypothesis buffer may be updated to advance or delay timing positions. Specifically, in instances where the sign of the initial frequency offset is positive, the timing position of samples in the associated PSS timing hypothesis buffer may be shifted or updated in order to delay timing. In instances where the sign of the initial frequency offset is negative, the timing position of samples in the corresponding PSS timing hypothesis buffer may be shifted or updated in order to advance timing. For example, for a MFH branch with an initial frequency offset of 2 ppm, the timing position of samples within an associated PSS timing hypothesis buffer may be shifted or updated so as to delay timing by one sample for every five hundred thousand samples. In instances where an initial frequency offset of −2 ppm is applied in the MFH branch, the timing position of samples within the PSS timing hypothesis buffer may be shifted so as to advance timing by one sample for every five hundred thousand samples.

Timing adjustment applied to a MFH branch may be utilized as a timing approximation or a timing estimate in MFHT. A MFH branch that best compensates for a true frequency offset in the mobile device 118 may then also best follow or track a true timing drift observed at the mobile device 118 due to the offset in frequency of the local oscillator signal. Accordingly, favorable conditions may be provided in an associated PSS timing hypothesis buffer to optimally process PSS correlation data at true sample positions over a prolonged processing period. Across all the MFH branches, a candidate PSS for the particular PSS transmitted from the base station 110*a* may be selected based on the maximum correlation peak magnitude or the maximum accumulated energy associated with the PSS transmissions in corresponding MFH branches. The selected candidate PSSs may be utilized for various baseband processes such as SSS detection in each MFH branch for frame boundary synchronization, cell group information identification, and/or cyclic prefix (CP) length detection, when needed. A particular MFH branch that is indicated by the maximum PSS correlation peak magnitude over the entire set of MFH branches may be selected. The mobile device 118 may utilize information such as transmission parameters that are derived from the selected particular MFH branch to start camping on a corresponding cell such as the cell 110.

In an exemplary operation, the base station 110*a* may be operable to perform communications within the cell 110 using physical channels and physical signals such as a PSS and a SSS. The base station 110*a* may be operable to transmit base station specific PSS and SSS, regularly, for example, every 5 ms. To communicate with the base station 110*a*, a mobile device such as the mobile device 118 may acquire the PSS and SSS transmitted from the base station 110*a* so as to determine one or more transmission parameters utilized by the base station 110*a*. For example, the mobile device 118 may be operable to acquire PSS synchronization to identify the PSS timing. In this regard, the mobile device 118 may be operable to perform MFHT for a correct PSS timing hypothesis and frequency offset estimation. The mobile device 118 may start MFHT with a set of different initial frequency offsets spanning a frequency offset estimation range such as, for example, +/−15 ppm. The mobile device 118 may be operable to apply the set of different initial frequency offsets to corresponding MFH branches. A baseband signal with a PSS from the base station 110a may be frequency offset in each MFH branch utilizing initial frequency offsets applied to corresponding MFH branches.

Timing drift in MFHT may be tracked and compensated for so as to provide optimal frequency offset estimation. Depending on initial frequency offsets that are applied to the corresponding MFH branches, timing drift may be compensated in MFHT by a certain amount of samples within PSS timing hypothesis buffers. A rate for updating the timing position of samples in a PSS timing hypothesis buffer associated with a specific MFH branch may be determined based on an initial frequency offset that is applied to the specific MFH branch. The timing position of samples in the PSS timing hypothesis buffer may be shifted or adjusted so as to advance or delay timing depending on the sign of the initial frequency offset applied to the specific MFH branch. Timing adjustment in each MFH branch may be utilized as timing estimates for the MFHT. A candidate PSS for the received PSS may be selected in each MFH branch based on the maximum correlation peak magnitude in corresponding MFH branches. Information provided by the selected candidate PSSs may be utilized for various baseband processes such as SSS detection whenever needed. A particular MFH branch may be selected from the entire set of MFH branches based on the maximum PSS correlation peak magnitude. Information from the selected particular MFH branch may be utilized by the mobile device 118 to communicate information in the cell 110.

Figure 2:
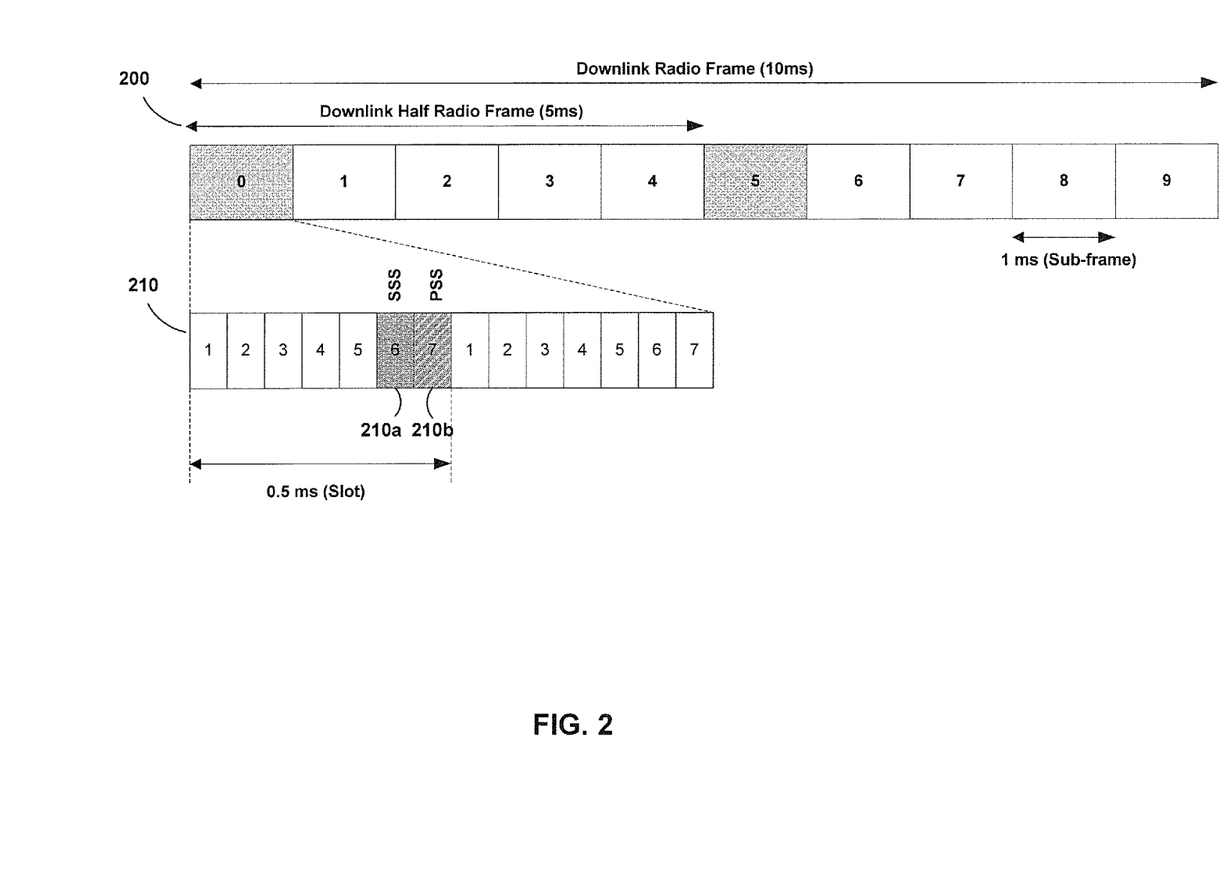
FIG. 2 is a block diagram of an exemplary downlink synchronization signal structure, which is utilized in accordance with an embodiment of the invention.

FIG. 2 is a block diagram of an exemplary downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated Cell-ID and/or antenna configuration.

The PSS 210a and the SSS 210b may be transmitted on sub-frame 0 and 5 of the downlink radio frame 200 and occupy two consecutive symbols in a corresponding sub-frame. The PSS 210a may be used to identify the symbol timing and the Cell-ID within a cell ID group. The SSS 210b may be used for identifying frame boundary, detecting cell ID group, and/or acquiring system parameters such as cyclic prefix (CP) length. The SSS detection for the SSS 210b may start after a successful PSS synchronization on the PSS 210a. The PSS synchronization may provide timing and frequency offset information for the downlink radio frame 200. To acquire accurate timing and frequency offset with limited resources, a MFHT may be performed for the downlink radio frame 200. A PSS correlation process for the PSS 210a may be performed in each MFH branch for a correct PSS timing hypothesis and frequency offset estimation. PSS correlation data corresponding to the PSS 210a may be processed in PSS timing hypothesis buffers associated with corresponding MFH branches. The timing position of samples in PSS timing hypothesis buffers may be updated based on initial frequency offsets placed in corresponding MFH branches so as to compensate timing drift in MFHT. The SSS 210b may be detected in each MFH branch after the detection of the PSS 210a for cell-specific parameters such as, for example, Cell-ID and/or cyclic prefix (CP) length.

Figure 3:
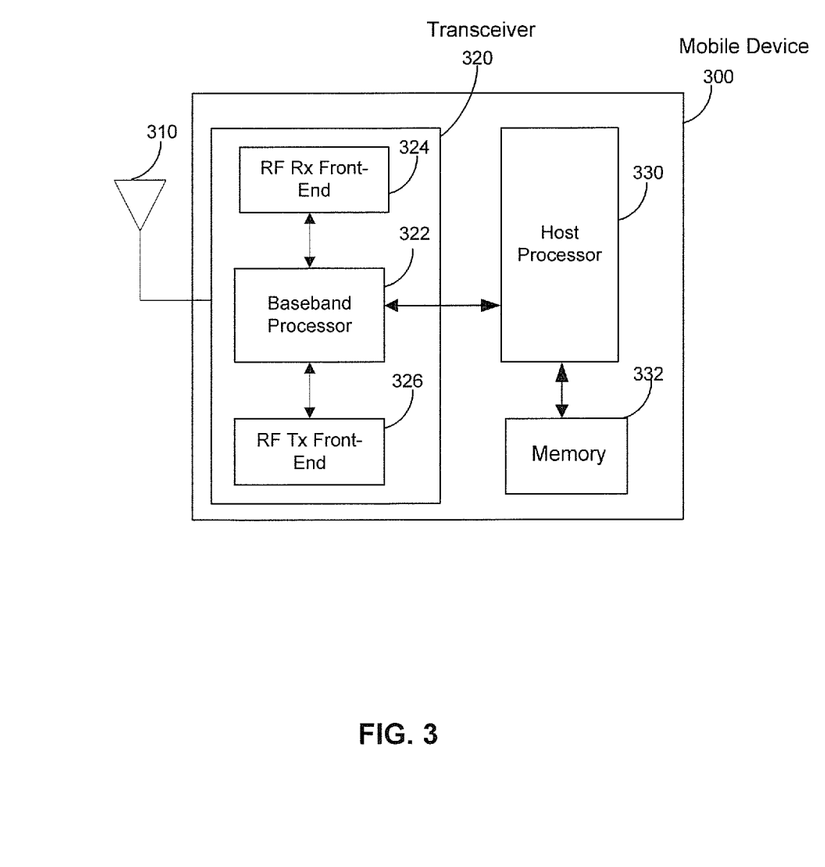
FIG. 3 is a block diagram of an exemplary mobile device that may be operable to track and provide compensation for timing drift in multiple frequency hypothesis testing (MFHT), in accordance with an embodiment of the invention.

FIG. 3 is a block diagram of an exemplary mobile device that may be operable to track and provide compensation for timing drift in multiple frequency hypothesis testing (MFHT), in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring correct PSS timing and/or frequency offset.

Various factors such as, for example, propagation delay, Doppler shift, and/or oscillator drift, may cause a wide range of uncertainties on the correct PSS symbol timing and/or local oscillator frequency offset. In this regard, the baseband processor 322 may be operable to perform MFHT for a correct PSS timing hypothesis and/or local oscillator frequency offset estimation. The baseband processor 322 may be operable to start MFHT with a set of different initial frequency offsets spanning over a frequency offset estimation range such as, for example, +/−15 ppm. Each of the set of different initial frequency offsets may be applied or assigned to only one of the MFH branches, respectively. In each MFH branch, the baseband processor 322 may be operable to apply a corresponding initial frequency offset to the received baseband signal.

The baseband processor 322 may be operable to perform a PSS correlation process in each MFH branch for a correct PSS timing hypothesis and frequency offset estimation. PSS correlation data may be buffered in PSS timing hypothesis buffers in corresponding MFH branches. The baseband processor 322 may be configured to track and compensate timing drift in PSS timing hypothesis buffers so as to provide optimal frequency offset estimation. In this regard, the baseband processor 322 may be operable to update the timing position of samples in PSS timing hypothesis buffers based on initial frequency offsets applied to the corresponding MFH branches. More specifically, the timing position of samples in the timing hypothesis buffer may be updated at a rate specified by an initial frequency offset assigned to an associated MFH branch. For example, for a MFH branch with an initial frequency offset of 5 ppm, the baseband processor 322 may update the timing position of samples in the PSS timing hypothesis buffer once every two hundred thousand samples. In addition, the baseband processor 322 may be operable to shift or update timing positions for samples in PSS timing hypothesis buffers to provide timing advance or delay, depending on the sign of initial frequency offsets that are applied to the corresponding MFH branches.

For example, for a MFH branch with an initial frequency offset of 2 ppm, the baseband processor 322 may be operable to alter the timing position of samples within an associated PSS timing hypothesis buffer by one sample delay position at a rate of once every five hundred thousand samples. In instances where an initial frequency offset of −2 ppm, is placed in the MFH branch, the timing position of samples within the PSS timing hypothesis buffer may be shifted or updated to advance one sample position at a rate of once every five hundred thousand samples. A MFH branch that best compensates for a true frequency offset that occurs at the mobile device 300 may also enable the best tracking of a true sampling position timing drift observed at the mobile device 300 due to the offset in frequency of the local oscillator signal. A candidate PSS for a received PSS may be selected from all of the MFH branches based on the maximum correlation peak magnitude observed across all of the MFH branches. A particular MFH branch associated with the maximum PSS correlation peak magnitude over the entire set of MFH branches may be identified from the selected candidate PSSs. The baseband processor 322 may be operable to utilize information such as a correct PSS timing hypothesis and frequency offset estimate that comes from the identified particular MFH branch to support operations on the mobile device 300. For example, the baseband processor 322 may be operable to feed back the frequency offset estimate to adjust a receiver local oscillator signal frequency utilized by the mobile device 300.

The host processor 330 may comprise suitable logic, circuitry, interfaces and/or code that may be operable to manipulate and control operation of the transceiver 320. The host processor 330 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 324 may be operable to process a RF signal received via the antenna 310 over the LTE/E-UTRA air interface, for example. The received RF signal may comprise PSSs and SSSs transmitted by base stations such as the base station 110a and/or the base station 120a. The received RF signal may be converted to a corresponding baseband signal and communicated to the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of correlation reference sequences (reference PSSs) for acquiring PSS synchronization.

In order to acquire accurate PSS symbol timing and/or frequency offset, the baseband processor 322 may be operable to perform MFHT on the baseband signal. The baseband processor 322 may start MFHT with a set of different initial frequency offsets spanning a frequency offset estimation range such as, for example, +/−15 ppm. The baseband processor 322 may be operable to assign the set of different initial frequency offsets to only one of each of the MFH branches, respectively. The assigned initial frequency offsets may be allocated to corresponding MFH branches via frequency mixing. The baseband processor 322 may be operable to perform PSS correlation in each MFH branch after frequency mixing. PSS correlation data over one or more repetition intervals of the PSS transmission may be buffered in corresponding PSS timing hypothesis buffers. Timing drift in MFHT may be tracked and compensated in PSS timing hypothesis buffers based on initial frequency offsets applied to corresponding MFH branches. The baseband processor 322 may be operable to accumulate energy associated with PSS transmissions in PSS timing hypothesis buffers utilizing PSS correlation data at updated sampling positions. A candidate PSS for a received PSS may be selected in each MFH branch based on the maximum correlation peak magnitude in corresponding MFH branches. A particular MFH branch associated with the maximum PSS correlation peak magnitude over the entire set of MFH branches may be selected. The mobile device 300 may utilize information from the selected particular MFH branch to maintain communication within a cell such as the cell 110. For example, a frequency offset estimate provided by the particular MFH branch may be fed back to adjust a receiver local oscillator signal frequency utilized for communications on the mobile device 300.

Figure 4:
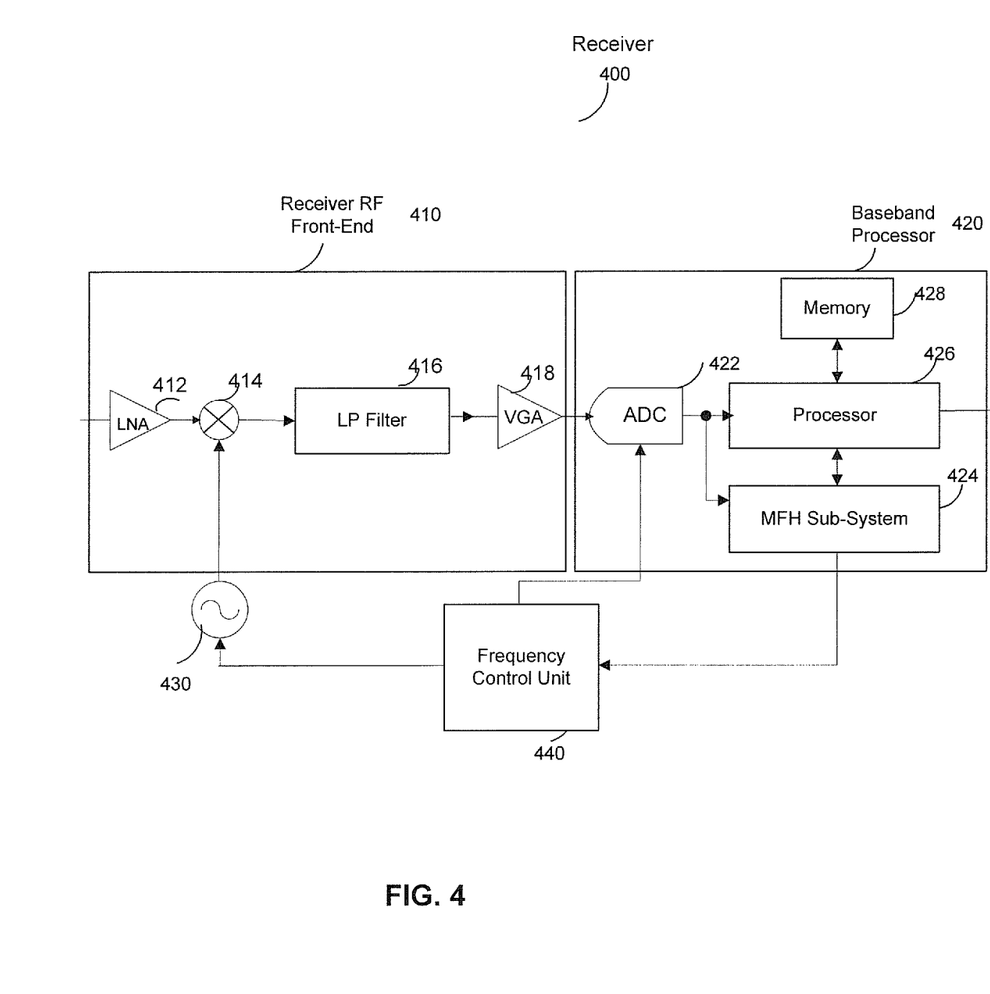
FIG. 4 is a block diagram illustrating an exemplary receiver that is operable to track and provide compensation for timing drift in multiple frequency hypothesis testing (MFHT), in accordance with an embodiment of the invention.

FIG. 4 is a block diagram illustrating an exemplary receiver that is operable to track and provide compensation for timing drift in multiple frequency hypothesis testing (MFHT), in accordance with an embodiment of the invention. Referring to FIG. 4, there is shown a receiver 400. The receiver 400 comprises a receiver radio frequency (RF) front-end 410, a baseband processor 420, a local oscillator 430 and a frequency control unit 440. The receiver RF front-end 410 comprises a low noise amplifier (LNA) 412, a mixer 414, a low pass (LP) filter 416, and a variable-gain amplifier (VGA) 418. The baseband processor 420 comprises an analog-to-digital converter (ADC) 422, a multiple frequency hypothesis subsystem 424, a processor 426 and a memory 428.

The receiver RF front-end 410 may comprise suitable logic, circuitry, interfaces and/or code that may be operable to process a RF signal received via the antenna 310. The received RF signal may comprise a PSS and a SSS. The receiver RF front-end 410 may be operable to convert the received RF signal to a corresponding baseband frequency, which may be further processed by the baseband processor 420.

The LNA 412 may comprise suitable logic, circuitry, interfaces and/or code that may be operable to amplify a RF signal received by the antenna 310. The LNA 412 may be operable to essentially set a limit for how low a system noise figure may reach. The LNA 412 may be enabled to achieve a low noise performance, which is crucial for a high performance radio frequency (RF) front end.

The mixer 414 may comprise suitable logic, circuitry, interfaces and/or code that may be operable to translate the amplified RF signal from the LNA 412 to a lower, intermediate frequency (IF) signal using signals provided by a local oscillator 430, which is driven by a reference frequency provided by the frequency control unit 440.

The LP filter 416 may comprise suitable logic, circuitry, interfaces and/or code that may be operable to filter the IF signal from the mixer 414 so as to remove unwanted signal components. The LP filter 416 may be operable to convert the resulting IF signal to a desired analog baseband signal.

The VGA 418 may comprise suitable logic, circuitry, interfaces and/or code that may be operable to amplify the analog baseband signal from the LP filter 416. The VGA 418 may be operable to apply different gains to the analog baseband signal resulting in a variable signal level at the input to the ADC 422.

The ADC 422 may comprise suitable logic, circuitry, interfaces and/or code that may be operable to convert analog baseband signals received from the VGA 418 of the receiver RF front-end 410 to a corresponding digital baseband signal (e.g., digital samples). The ADC 422 may be operable to sample the received analog baseband signal at an analog-to-digital sampling rate of, for example, 30.72 MHz, which is derived from the reference frequency provided by the frequency control unit 440. The resulting digital baseband signal may comprise values that are representative of the analog baseband signal amplitudes. The digital baseband signal may be communicated with the MFH sub-system 424 for acquiring correct PSS timing and/or frequency offset. The digital baseband signal may be communicated with the processor 426 for other baseband processing such as the SSS detection.

The MFH sub-system 424 may comprise suitable logic, circuitry, interfaces and/or code that may be operable to perform MFHT for accurate PSS timing and/or frequency offset estimation. The MFH sub-system 424 may start MFHT with a set of different initial frequency offsets. The set of different initial frequency offsets may cover a frequency offset estimation range such as, for example, +/−15 ppm. A different initial frequency offset may be applied or assigned to different MFH branches. In each MFH branch, the MFH sub-system 424 may be operable to apply the assigned initial frequency offset to a baseband signal via frequency mixing followed by a PSS correlation process. PSS correlation data over one or more repetition intervals of the PSS transmission may be buffered and processed in PSS timing hypothesis buffers in corresponding MFH branches. The MFH sub-system 424 may be configured to track and provide compensation for sampling position timing drift in PSS timing hypothesis buffers. The timing position of samples in PSS timing hypothesis buffers may be updated at a rate that may be dependent on the initial frequency offsets assigned to corresponding MFH branches.

The timing position of samples in the PSS timing hypothesis buffers may be updated so as to advance or delay timing positions based on the sign of corresponding initial frequency offsets. For example, for a MFH branch with an initial frequency offset of 2 ppm, the MFH sub-system 424 may shift or update the timing position of samples in an associated PSS timing hypothesis buffer to a one sample delay position once every five hundred thousand samples. In instances where an initial frequency of −2 ppm is placed in the MFH branch, the MFH sub-system 424 may be operable to shift or update the timing position of samples in the associated PSS timing hypothesis buffer to a one sample advance position once every five hundred thousand samples. Energy associated with received PSS transmissions may be accumulated in PSS timing hypothesis buffers utilizing PSS correlation data at updated sampling positions.

The MFH sub-system 424 may select a candidate PSS in each MFH branch for a received PSS based on the maximum correlation peak magnitude in corresponding MFH branches. Information that is generated from a particular MFH branch associated with the maximum PSS correlation peak magnitude over the entire set of MFH branches may be communicated to the processor 426 and the frequency control unit 440 to support operations within the receiver 400. For example, a frequency offset estimate provided by the particular MFH branch may be fed back to the frequency control unit 440 where it may be utilized to adjust a receiver local oscillator signal frequency from the local oscillator 430.

The processor 426 may comprise suitable logic, circuitry, interfaces and/or code that may be operable to process digital baseband signals from the ADC 422. The processor 426 may be operable to perform various baseband procedures such as channel equalization using information from the MFH sub-system 424.

The memory 428 may comprise suitable logic, circuitry, interfaces and/or code that may enable storage of information such as executable instructions and data that may be utilized by associated device components such as the processor 426 in the receiver 400. The executable instructions may constitute algorithms that may be applied to various baseband procedures such as channel estimation, channel equalization, and/or channel coding. The data may comprise timing and/or frequency offset hypotheses. The memory 428 may comprise RAM, ROM, low latency nonvolatile memory such as flash memory and/or other suitable electronic data storage.

The local oscillator 430 may comprise suitable logic, circuitry, interfaces and/or code that may be operable to provide a mixing signal to the mixer 414 of the receiver 400. The local oscillator 430 may be operable to be adjustable in frequency on the basis of a reference signal provided by the frequency control unit 440 according to frequency offset estimates provided by the MFH sub-system 424.

The frequency control unit 440 may comprise suitable logic, circuitry, interfaces and/or code that may be operable to control the settings for the corresponding reference frequency of the local oscillator 430 and the ADC 422. The frequency control unit 440 may be operable to adjust the reference frequencies of the local oscillator 430 and the ADC 422, respectively, according to the frequency offset estimates from the MFH sub-system 424. The operation of the frequency control unit 440 may be operable to control the timing and/or the local oscillator signal frequency of the receiver 400.

In an exemplary operation, the receiver 400 may be operable to receive a RE signal from the antenna 310, for example. The received RF signal may comprise a PSS and a SSS. The receiver RF front-end 410 may be operable to amplify the received RF signal via the LNA 412 and convert it to a baseband signal via the mixer 414 and the LP filter 416, respectively. The baseband signal may be amplified via the VGA 418 and converted to a digital baseband signal via the ADC 422. The digital baseband signal may be processed by the MFH sub-system 424 and utilized for acquiring accurate PSS timing and/or frequency offset estimates. In this regard, a set of different initial frequency offsets covering a frequency offset estimation range such as, for example, +/−15 ppm may be determined or selected. The determined or selected initial frequency offset may be applied or assigned to different MFH branches. The digital baseband signal from the ADC 422 may be frequency offset in each MFH branch utilizing initial frequency sets placed in corresponding MFH branches.

A PSS correlation process may be performed in each MFH branch subsequent to frequency mixing. Resulting PSS correlation data over one or more repetition intervals of the PSS transmission may be buffered in PSS timing hypothesis buffers in corresponding MFH branches. Timing drift in MFHT may be tracked and compensated in PSS timing hypothesis buffers based on initial frequency offsets applied to the corresponding MFH branches. In this regard, the MFH sub-system 424 may be configured to update the timing position of samples in the PSS timing hypothesis buffers at a rate indicated by corresponding initial frequency offsets. The timing position of the samples in PSS the timing hypothesis buffers may be shifted or updated to advance or retard timing depending on the sign of the corresponding initial frequency offsets. Energy associated with the PSS transmissions may be calculated or accumulated in each PSS timing hypothesis buffer utilizing corresponding PSS correlation data at updated sampling positions. The MFH sub-system 424 may select a candidate PSS for a received PSS across all MFH branches based on the maximum correlation peak magnitude across all MFH branches. A particular MFH branch is selected based on the maximum PSS correlation peak magnitude over the entire set of MFH branches. Information that is derived from the selected particular MFH branch may be used to support various operations within the receiver 400.

Figure 5:
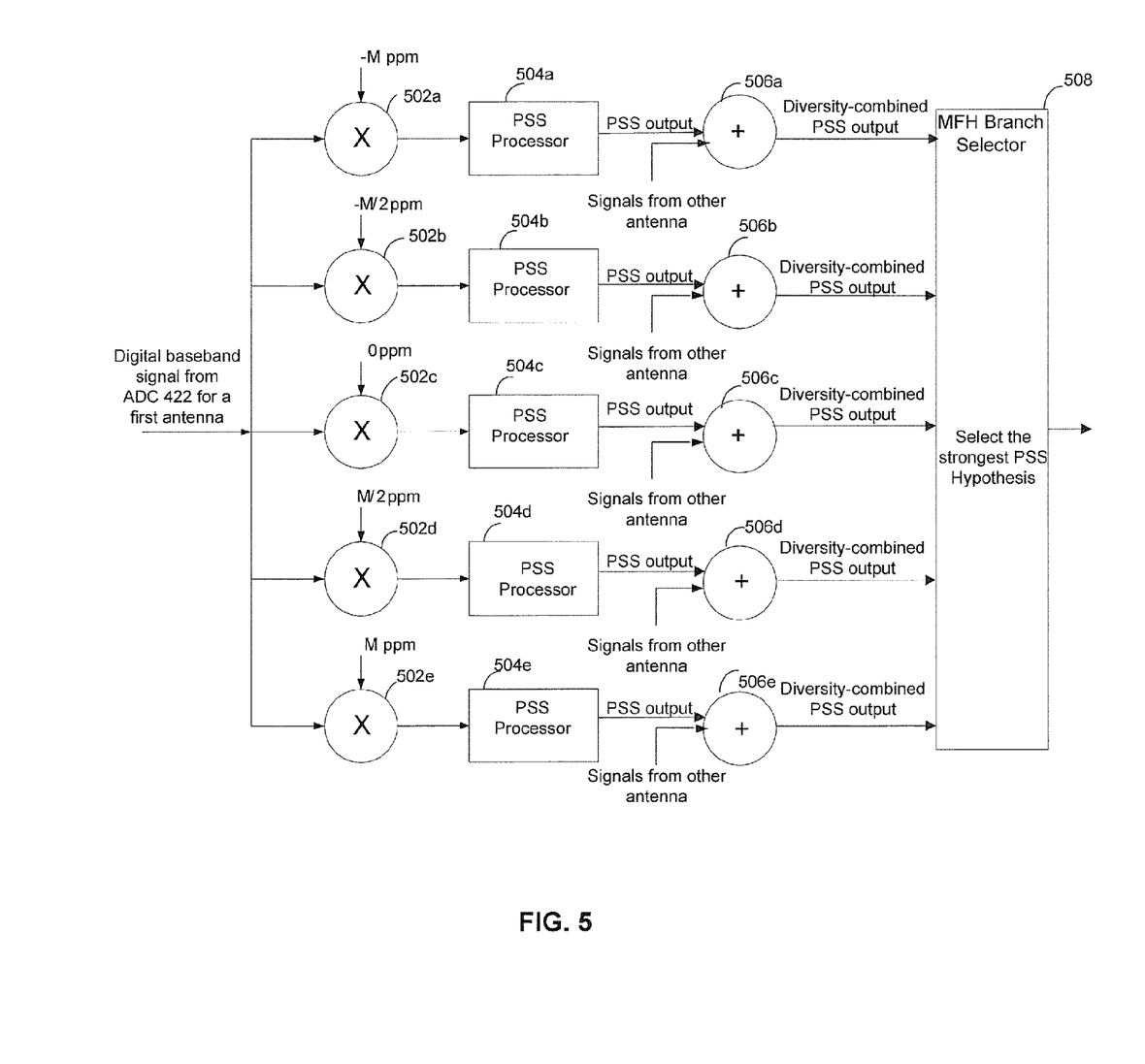
FIG. 5 is a diagram illustrating an exemplary multi-frequency hypothesis structure for frequency offset estimation, in connection with various embodiments of the invention.

FIG. 5 is a diagram illustrating an exemplary multi-frequency hypothesis structure for frequency offset estimation, in connection with various embodiments of the invention. Referring to FIG. 5, there are shown multipliers 502a, 502b, 502c, 502d, and 502e, Primary Synchronization Signal (PSS) processors 504a, 504b, 504c, 504d, and 504e, adders 506a, 506b, 506c, 506d, and 506e, and a MFH branch selector 508. There is also shown a digital baseband (BB) signal input from a first antenna, and a plurality of input signals from similar multi-hypotheses structures from possible other antennas, in the case of a multi-antenna system.

The multipliers 502a, 502b, 502c, 502d, and 502e may comprise suitable logic, circuitry, interfaces and/or code that may be operable to multiply a plurality of input signals, and generate an output signal that may be proportional to the product of the plurality of input signals. The PSS processors 504a, 504b, 504c, 504d, and 504e may comprise suitable logic, circuitry, interfaces and/or code that may be operable to generate a PSS output signal. The adders 506a, 506b, 506c, 506d, and 506e may comprise suitable logic, circuitry, interfaces and/or code that may be operable to generate an output signal that may be proportional to the sum of a plurality of input signals. In this regard, the adders 506a, 506b, 506c, 506d, and 506e may be operable to produce a diversity-combined PSS output signal in corresponding MFH branches.

The MFH branch selector 508 may comprise suitable logic, circuitry, interfaces and/or code that may be operable to generate an output signal that may correspond to one of a plurality of input signals, based on a decision metric computed from the plurality of input signals.

A frequency offset of a receiver local oscillator signal from a target frequency may be estimated through a plurality of hypothesis tests based on a plurality of frequency offsets, as illustrated in FIG. 5. For example, for a received baseband signal from a particular receiver antenna, it may be desirable to estimate a receiver local oscillator signal frequency offset. In this regard, the received baseband signal may be communicatively coupled to a plurality of multipliers, of which an exemplary embodiment with multipliers 502a, 502b, 502c, 502d, and 502e is illustrated. At a multiplier such as the multiplier 502a, the received baseband signal may be offset in frequency by a certain offset −M Hz, through suitable multiplication with an offset signal. For example, if the received baseband signal may be at frequency (x+d), where x may be a desired frequency without offset, and d may be the actual offset from frequency x in the received baseband signal, the output signal of multiplier 502a may be at a frequency (x+d−M). Similarly, the outputs of multipliers 502b, 502c, 502d and 502e may be at frequencies (x+d−M/2), (x+d), (x+d+M/2), (x+d+M), respectively. Thus, the multipliers 502a, 502b, 502c, 502d, and 502e may apply a set of offset frequencies to an input signal. For signals received at baseband, the desired frequency x may typically be x=0.

The outputs of the multipliers 502a, 502b, 502c, 502d, and 502e may be communicatively coupled to the PSS processors 504a, 504b, 504c, 504d, and 504e, respectively. At the PSS processor 504a, for example, the PSS output signal from the multiplier 502a may be correlated with a set of locally generated reference primary synchronization signals (PSSs). Typically, a higher correlation magnitude between a local reference PSS signal and the output signal of the multiplier 502a may indicate a lower offset between actual and desired local oscillator frequency at the receiver, which may be manifested by the output of the multiplier 502a. Thus, in accordance with various embodiments of the invention, a higher correlation PSS output magnitude of the PSS processor 504a may correspond to a small difference in frequency between an output signal of the multiplier 502a at frequency (d−M) and a reference PSS signal at baseband. Hence, a high correlation value may indicate that a certain offset M may compensate a certain offset d relatively well, that is, in the above example, d−M may be small. Similarly, the PSS processors 504b, 504c, 504d, and 504e may compare a reference PSS signal at baseband, with the correspondingly offset output of the multipliers 502b, 502c, 502d, and 504e, respectively.

In instances where multiple antenna systems may be utilized, for example in a MIMO system, the received baseband signals from each antenna may be processed similarly. For example, a second antenna signal may be offset in a multiplier similar to the multiplier 502a, and correlated with a reference PSS signal in a PSS correlation operation performed similar to the PSS/SSS processor 504a. In these instances, the plurality of PSS outputs corresponding to an offset for one or more antennas may be combined by the adders 506a, 506b, 506c, 506d, and 506e. For example, the PSS outputs from at least a second antenna may be combined with the PSS output of the PSS processor 504a for an offset −M, in the adder 506a, as illustrated in FIG. 5.

To determine, the most appropriate frequency offset estimate, the MFH branch selector 508 may choose between the outputs of the adders 506a, 506b, 506c, 506d, and 506e, for example by choosing the frequency hypothesis test corresponding to the largest correlation value. That is, the MFH branch selector 408 may typically choose the output of the adders 506a, 506b, 506c, 506d, and 506e corresponding to the smallest difference |d+s|, where, for example, $$s \in \left\{ -M, -\frac{M}{2}, 0, \frac{M}{2}, M \right\},$$

as illustrated in accordance with various embodiments in FIG. 5. The output of the MFH branch selector 508 may indicate which output of the adders 506a, 506b, 506c, 506d, and 506e may have been selected, and thus provides a frequency offset estimate through the corresponding frequency offset applied in the multiplier associated with the selected adder output.

When the frequency offset d is limited to a certain finite range of frequencies, the resolution of the hypothesis testing as illustrated in FIG. 5 may depend on the number of different hypotheses that may be tested. As illustrated in FIG. 5, an exemplary 5 hypotheses may be tested. Similarly, a higher accuracy may be obtained, for example, by using 9 hypothesis tests, whereby the difference |d+s|, may be computed from an exemplary set of offsets $$s \in \left\{ -M, -\frac{3M}{4}, -\frac{M}{2}, -\frac{M}{4}, 0, \frac{M}{4}, \frac{M}{2}, \frac{3M}{4}, M \right\}.$$

The increased accuracy may lead to an increase in hypothesis testing hardware, similar to the one illustrated in FIG. 5.

Figure 6:
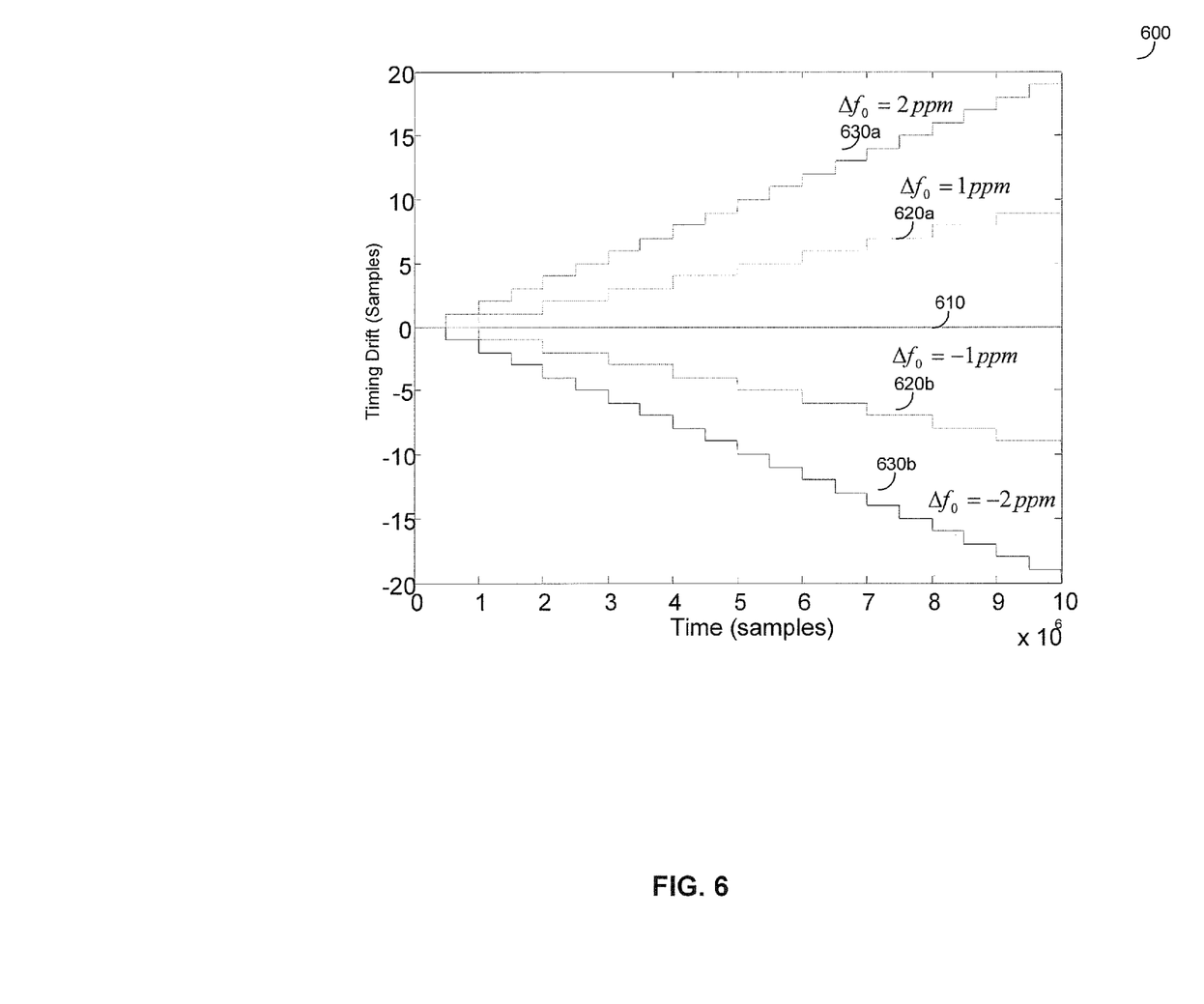
FIG. 6 is a diagram illustrating exemplary timing drift subject to sampling frequency offsets applied to MFH branches, in accordance with an embodiment of the invention.

FIG. 6 is a diagram illustrating exemplary timing drift subject to sampling frequency offsets placed in MFH branches, in accordance with an embodiment of the invention. Referring to FIG. 6, there are shown timing drift subject to sampling frequency offsets 610, 620a-620b and 630a-630b placed in MFH branches. As shown in FIG. 6, different initial frequency offsets are placed in different MFH branches. For example, initial frequency offsets of 0 ppm and –2 ppm are placed in the MFH branches and are represented by 610 and 630b, respectively.

In various embodiments of the invention, timing drift may be tracked in each of the MFH branches and is represented by 610-630b. In this regard, compensation may be provided for timing drift in each of the MFH branches 610-630b based on corresponding initial frequency offsets placed in each of the MFH branches. Specifically, in a given MFH branch, timing drift may be compensated at a rate indicated by an initial frequency offset placed in a corresponding MFH branch. For example, an initial frequency offset of –2 ppm is applied to the MFH branch associated with 630b, the timing position of samples in a PSS timing hypothesis buffer associated with the MFH branch associated with 630b may be updated once every five hundred thousand samples. Timing position of samples in a PSS timing hypothesis buffer may be shifted or updated to advance or retard timing depending on an initial frequency offset placed in a corresponding MFH branch. For example, timing positions of samples in the PSS timing hypothesis buffer for the MFH branch 630b are shifted or updated by one sample to advance timing once every five hundred thousand samples due to a negative initial frequency offset of –2 ppm. When a positive initial frequency offset of 1 ppm is applied to the MFH branch associated with 620a, the samples in a PSS timing hypothesis buffer for the MFH branch associated with 620a are retarded or delayed by one sample for every one million samples.

Figure 7:
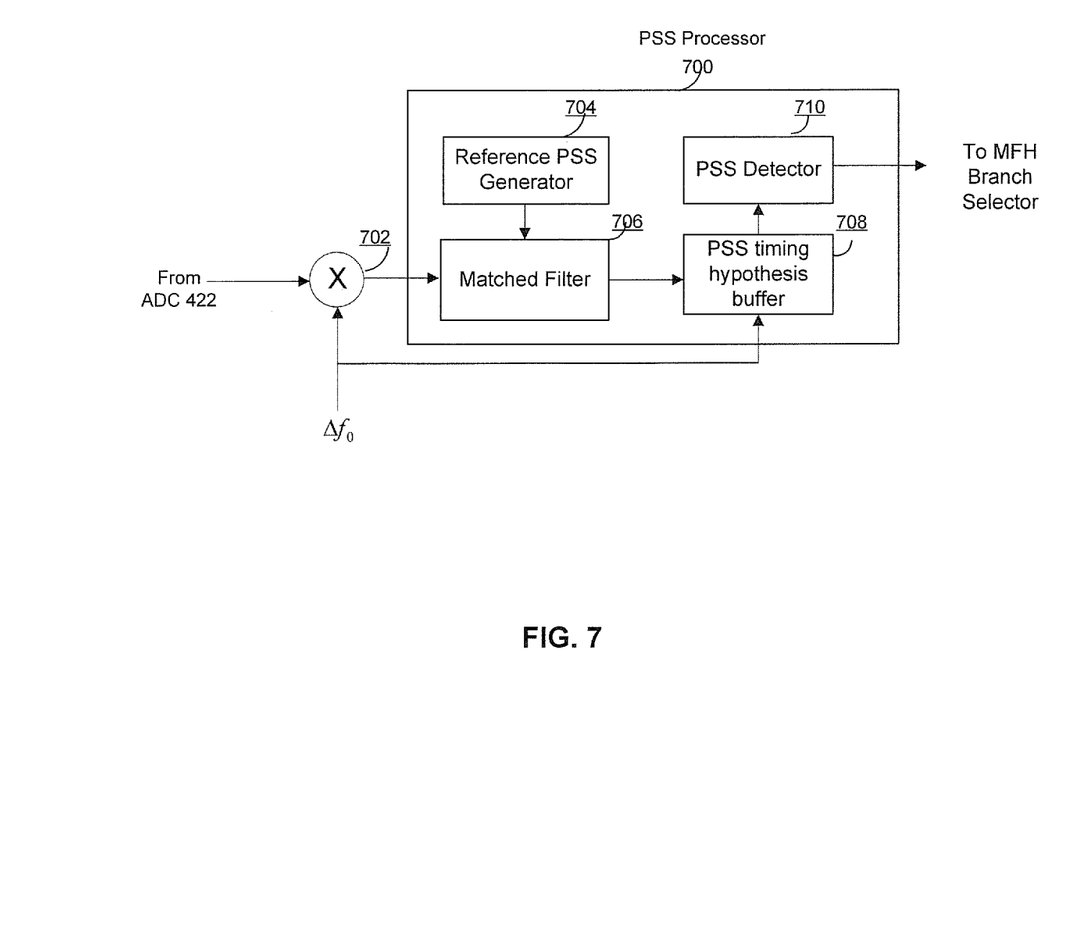
FIG. 7 is a block diagram illustrating an exemplary PSS processor that is operable to track and provide compensation for timing drift in a PSS timing hypothesis buffer, in accordance with an embodiment of the invention.

FIG. 7 is a block diagram illustrating an exemplary PSS processor that is operable to track and provide compensation for timing drift in a PSS timing hypothesis buffer, in accordance with an embodiment of the invention. Referring to FIG. 7, there is shown a PSS processor 700. The PSS processor 700 that is coupled to a mixer 702 comprises a reference PSS generator 704, a matched filter 706, a PSS timing hypothesis buffer 708 and a PSS detector 710.

The mixer 702 may comprise suitable logic, circuitry, interfaces and/or code that may be operable to frequency offset a signal from the ADC by a frequency offset of $\Delta f_0$.

The reference PSS generator 704 may comprise suitable logic, circuitry, interfaces and/or code that may be operable to generate a plurality of reference PSSs.

The matched filter 706 may comprise suitable logic, circuitry, interfaces and/or code that may be operable to correlate signals from the ADC 422 with each of a plurality of reference PSSs generated by the reference PSS generator 702. The resulting PSS correlation data may be provided to the PSS timing hypothesis buffer 708 for further processing.

The PSS timing hypothesis buffer 708 may comprise suitable logic, circuitry, interfaces and/or code that may be operable to buffer and process PSS correlation data from the matched filter 706. The PSS timing hypothesis buffer 708 may be configured to track and provide compensation for timing drift in MFHT based on the initial frequency offset $\Delta f_0$ placed in a corresponding MFH branch. The PSS timing hypothesis buffer 708 may be operable to update the timing position of samples at a rate indicated by the initial frequency offset $\Delta f_0$. For example, in instances where the initial frequency offset $\Delta f_0$=–2 ppm, the PSS timing hypothesis buffer 708 may be operable to update the timing position of samples for every five hundred thousand samples. The timing position of samples in the PSS timing hypothesis buffer 708 may be shifted or updated to advance or delay timing positions based on the sign of the initial frequency offset $\Delta f_0$. In instances where the sign of the initial frequency offset $\Delta f_0$ placed in the MFH branch is positive, the timing position of samples in the PSS timing hypothesis buffer 708 may be shifted or updated to provide delayed timing. In instances where the sign of the initial frequency offset $\Delta f_0$ placed in the MFH branch is negative, the timing position of samples in the PSS timing hypothesis buffer 708 may be shifted or updated to advance timing. PSS correlation data with updated sampling positions may be utilized for PSS detection.

The PSS detector 710 may comprise suitable logic, circuitry, interfaces and/or code that may be operable to accumulate energy associated with the PSS transmissions. PSS correlation data at updated sampling positions may be utilized for calculating the accumulated energy for the PSS transmissions. A candidate PSS may be determined or detected based on the maximum accumulated energy for the PSS transmissions. The PSS detector 710 may be operable to communicate the detected candidate PSS to the MFH branch selector 508 for MFH branch selection.

In an exemplary operation, a digital baseband signal may be received from the ADC 422. The received digital baseband signal may comprise amongst other signals a PSS. An initial frequency $\Delta f_0$ is placed in the received digital baseband signal via the mixer 702. The received digital baseband signal with the initial frequency $\Delta f_0$ may be correlated with a plurality of reference PSSs provided by the reference PSS generator 704. PSS correlation data may be buffered and processed in the PSS timing hypothesis buffer 708. Timing drift in MFHT may be tracked and compensated within the PSS timing hypothesis buffer 708 based on the initial frequency $\Delta f_0$. In this regard, the PSS timing hypothesis buffer 708 may be operable to update the timing position of samples at a rate that may be determined based on the initial frequency $\Delta f_0$. For example, in instances where the initial frequency $\Delta f_0$ is −2 ppm, the timing position of samples within the PSS timing hypothesis buffer 708 may be updated one sample every five hundred thousand samples. Timing positions of samples in the PSS timing hypothesis buffer 708 may be shifted or updated to advance timing or delay timing based on the sign of the initial frequency offset $\Delta f_0$. In instances where the sign of the initial frequency offset $\Delta f_0$ is positive, timing positions of samples in the PSS timing hypothesis buffer 708 may be shifted to delay timing. In instances where the sign of the initial frequency offset $\Delta f_0$ is negative, timing positions of samples in the PSS timing hypothesis buffer 708 may be shifted or updated to advance timing. Due to the continual updating of PSS sample positions throughout the MFH testing procedure, energy associated with the PSS transmissions may be accumulated at a single PSS timing hypothesis for the MFH branch associated with the frequency offset which concurrently best compensates for the local oscillator frequency offset as well timing drift. A candidate PSS for the received PSS may be determined or detected based on the maximum accumulated energy associated with the PSS transmissions. Information of the detected candidate PSS may be provided to the MFH branch selector 508 for MFH branch selection.

Figure 8:
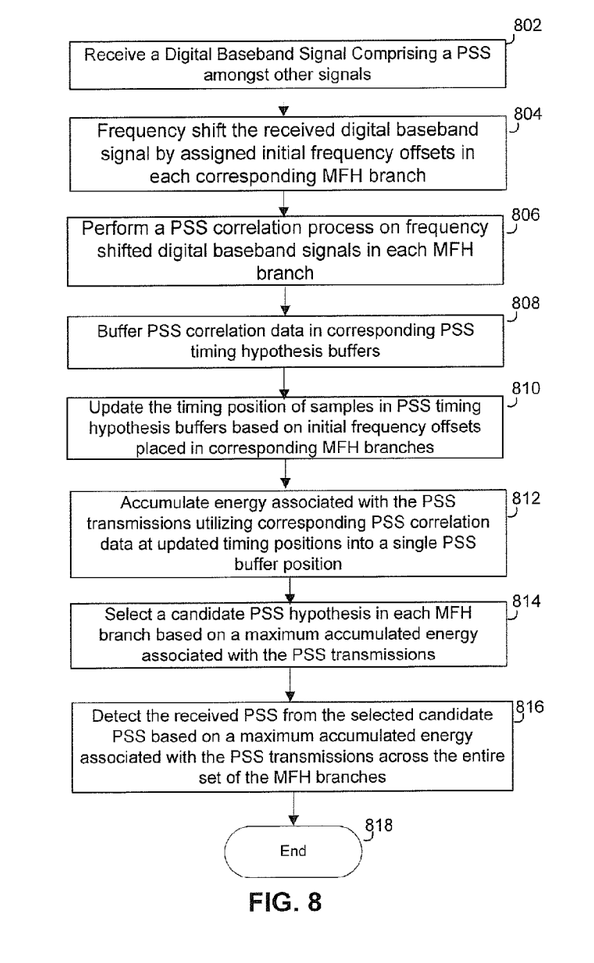
FIG. 8 is a diagram illustrating exemplary steps utilized by a receiver that tracks and provides compensation for timing drift in multiple frequency hypothesis testing (MFHT), in accordance with an embodiment of the invention.

FIG. 8 is a diagram illustrating exemplary steps utilized by a receiver that tracks and provides compensation for timing drift in multiple frequency hypothesis testing (MFHT), in accordance with an embodiment of the invention. The exemplary steps may start with the step 802. In step 802, the MFH sub-system 424 may be operable to receive a digital baseband signal from the ADC 422. The received digital baseband signal may comprise amongst others signals a PSS transmitted from the base station 110*a*, for example. In step 804, the MFH sub-system 424 may offset the frequency of the received digital baseband signal in each MFH branch utilized, based on initial frequency offsets. In step 806, a PSS correlation process may be performed in each MFH branch subsequent to frequency offsetting. In step 808, PSS correlation data may be buffered over one or more repetition intervals of the PSS transmissions in PSS timing hypothesis buffers of corresponding MFH branches. In step 810, the timing position of samples in PSS timing hypothesis buffers may be updated based on initial frequency offsets placed in corresponding MFH branches. In step 812, energy associated with the PSS transmissions may be accumulated into a single PSS timing hypothesis buffer position utilizing corresponding PSS correlation data at updated sampling positions for the MFH branch which concurrently best compensates for frequency offset and timing drift. In step 814, a candidate PSS hypothesis may be selected in each MFH branch based on a maximum accumulated energy associated with the PSS transmissions. In step 816, the received PSS may be detected from the selected candidate PSS based on a maximum accumulated energy associated with the PSS transmissions across the entire set of the MFH branches. The exemplary steps may end in step 818.

In various exemplary aspects of the method and system for tracking timing drift in multiple frequency hypothesis testing, a mobile device such as the mobile device 114 may be operable to receive a radio frequency (RF) signal from the base station 110*a*. The received signal may comprise a PSS and a SSS as shown in FIG. 2. The received PSS and SSS may be used by the mobile device 114 to acquire cell-specific parameters via the PSS synchronization and the SSS detection, respectively. In this regard, the mobile device 114 may be operable to perform MFHT via the MFH-subsystem 424 on a corresponding baseband signal of the received RF signal. The mobile device 114 may start MFHT by applying different initial frequency offsets to corresponding MFH branches. Timing drift in MFHT may be compensated based on initial frequency offsets placed in corresponding MFH branches. A PSS correlation process may be performed, for example, via the PSS processors 504*a*-504*e*, on the baseband signal from the ADC 422 in each MFH branch. Resulting PSS correlation data may be buffered and processed in corresponding PSS timing hypothesis buffers such as the PSS timing hypothesis buffer 708.

The timing position of samples in PSS timing hypothesis buffer 708 may be updated based on an initial frequency offset assigned to an associated MFH branch such as the MFH branch 620*a*. The timing position of samples in the PSS timing hypothesis buffer 708 may be updated at a rate which is indicated by the initial frequency offset that is assigned to the associated MFH branch. Sample timing positions in the PSS timing hypothesis buffer 708 may be updated in order to advance or delay timing depending on the sign of the initial frequency offset that is assigned to the associated MFH branch. In instances where the initial frequency offset that is assigned to the associated MFH branch is positive, the timing position of samples in the PSS timing hypothesis buffer 708 may be updated to retard or delay timing. In instances where the initial frequency offset placed in the associated MFH branch is negative, the timing position of samples in the PSS timing hypothesis buffer 708 may be updated to advance timing. Energy associated with the PSS transmissions may be calculated or accumulated in each MFH branch utilizing corresponding PSS correlation data at updated sampling positions. The received PSS may be detected based on the accumulated energy associated with the received PSS. More specifically, the received PSS may be detected based on a maximum accumulated energy associated with the PSS transmissions. The mobile device 114 may be operable to utilize information that comes from the detected PSS to start camping on the cell 110*a*.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for tracking timing drift in multiple frequency hypothesis testing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a mobile communication device:
receiving a signal comprising a primary synchronization sequence (PSS) transmitted from a base station;
performing multiple frequency hypothesis testing (MFHT) on said received signal utilizing multiple frequency hypothesis (MFH) branches; and
compensating for timing drift in said MFH branches based on initial frequency offsets applied to said corresponding MFH branches during said MFHT, including updating timing positions of data processed in said MFH branches based on said initial frequency offsets applied to said corresponding MFH branches.

2. The method according to claim 1, comprising:
performing a PSS correlation process in each of said MFH branches on said received signal.

3. The method according to claim 2, comprising buffering corresponding PSS correlation data in said each of said MFH branches.

4. The method according to claim 3, comprising updating, based on said initial frequency offsets associated with said corresponding MFH branches, timing positions at which corresponding magnitudes of said buffered PSS correlation data are accumulated.

5. The method according to claim 4, comprising determining rates for said updating based on said initial frequency offsets applied to said corresponding MFH branches.

6. The method according to claim 3, comprising updating a timing position for said corresponding buffered PSS correlation data based on a sign of each of said initial frequency offsets applied to said corresponding MFH branches.

7. The method according to claim 6, comprising updating said timing position of each of said corresponding buffered PSS correlation data to advance timing if said sign of each of said initial frequency offsets applied to said corresponding MFH branches are negative.

8. The method according to claim 6, comprising updating said timing position of each of said corresponding buffered PSS correlation data to retard timing if said sign of each of said initial frequency offsets applied to said corresponding MFH branches are positive.

9. The method according to claim 6, comprising accumulating energy associated with said received PSS utilizing said corresponding buffered PSS correlation data at said updated timing positions.

10. The method according to claim 9, comprising detecting said received PSS based on said accumulated energy associated with said received PSS.

11. A system for communication, the system comprising:
one or more processors and/or circuits for use in a mobile communication device, said one or more processor and/or circuits being configured to:
receive a signal comprising a primary synchronization sequence (PSS) transmitted from a base station;
perform multiple frequency hypothesis testing (MFHT) on said received signal utilizing multiple frequency hypothesis (MFH) branches; and
compensate for timing drift in said MFH branches based on initial frequency offsets applied to said corresponding MFH branches during said MFHT, wherein said timing drift is compensated by updating timing positions of data processed in said MFH branches based on said initial frequency offsets applied to said corresponding MFH branches.

12. The system according to claim 11, wherein said one or more processors and/or circuits are configured to perform a PSS correlation process in each of said MFH branches on said received signal.

13. The system according to claim 12, wherein said one or more processors and/or circuits are configured to buffer corresponding PSS correlation data in said each of said MFH branches.

14. The system according to claim 13, wherein said one or more processors and/or circuits are configured to update, based on said initial frequency offsets associated with said corresponding MFH branches, timing positions at which corresponding magnitudes of said buffered PSS correlation data are accumulated.

15. The system according to claim 14, wherein said one or more processors and/or circuits are configured to determine rates for said updating based on said initial frequency offsets applied to said corresponding MFH branches.

16. The system according to claim 13, wherein said one or more processors and/or circuits are configured to update a timing position for said corresponding buffered PSS correlation data based on a sign of each of said initial frequency offsets applied to said corresponding MFH branches.

17. The system according to claim 16, wherein said one or more processors and/or circuits are configured to update said timing position of each of said corresponding buffered PSS correlation data to advance timing if said signs of said initial frequency offsets placed in said corresponding MFH branches are negative.

18. The system according to claim 16, wherein said one or more processors and/or circuits are configured to update said timing position of each of said corresponding buffered PSS correlation data to retard timing if said sign of each of said initial frequency offsets applied to said corresponding MFH branches are positive.

19. The system according to claim 16, wherein said one or more processors and/or circuits are configured to accumulate energy associated with said received PSS utilizing said corresponding buffered PSS correlation data at said updated timing positions.

20. The system according to claim 19, wherein said one or more processors and/or circuits are configured to detect said received PSS based on said accumulated energy associated with said received PSS.

* * * * *